United States Patent [19]

Gottshall et al.

[11] Patent Number: 5,668,536
[45] Date of Patent: Sep. 16, 1997

[54] FLUID LEVEL SENSING APPARATUS

[75] Inventors: Paul C. Gottshall, Washington; Timothy A. Boston, Tremont; Kevin D. Ehrenhardt, Eureka, all of Ill.

[73] Assignee: Caterpillar Inc., Peoria, Ill.

[21] Appl. No.: 632,857

[22] Filed: Apr. 16, 1996

[51] Int. Cl.[6] ................................................ G08B 21/00
[52] U.S. Cl. ................................. 340/620; 73/304 R
[58] Field of Search ............................ 340/620, 450, 340/450.1, 450.3; 73/304 R, 295

[56] References Cited

U.S. PATENT DOCUMENTS

| | | | |
|---|---|---|---|
| 3,790,936 | 2/1974 | Knoll | 340/620 |
| 4,110,740 | 8/1978 | Akita et al. | 340/620 |
| 4,591,839 | 5/1986 | Charboneau et al. | 340/620 |
| 4,628,302 | 12/1986 | Barr et al. | 340/620 |
| 5,083,460 | 1/1992 | Kumada et al. | 340/620 |
| 5,210,769 | 5/1993 | Seidel et al. | 340/620 |

*Primary Examiner*—Jeffery Hofsass
*Assistant Examiner*—Anh La
*Attorney, Agent, or Firm*—David M. Masterson

[57] ABSTRACT

An apparatus for sensing the level of fluid, including a two electrode device being disposed in the fluid and a microprocessor. The microprocessor being connected to the two electrode device and delivering alternating current thereto. The microprocessor reads the voltage across the device, compares the voltage to a predetermined voltage level, and produces a warning signal in response to the fluid level being below a predetermined fluid level.

10 Claims, 2 Drawing Sheets

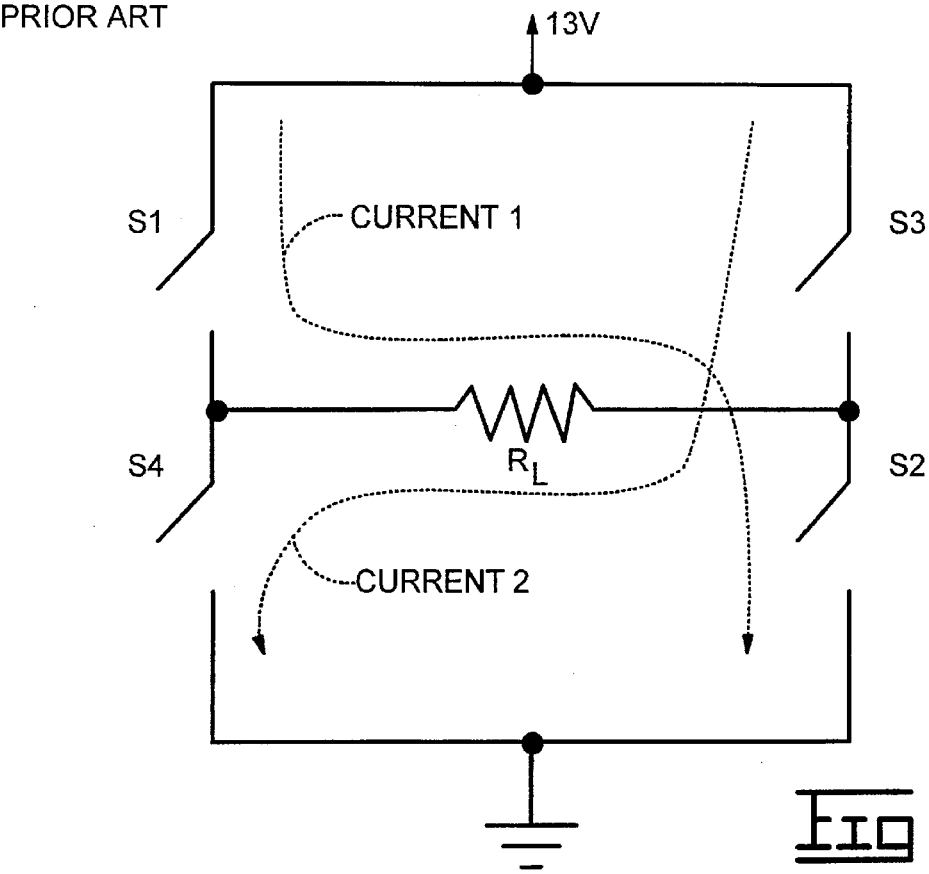
Fig_1_ PRIOR ART
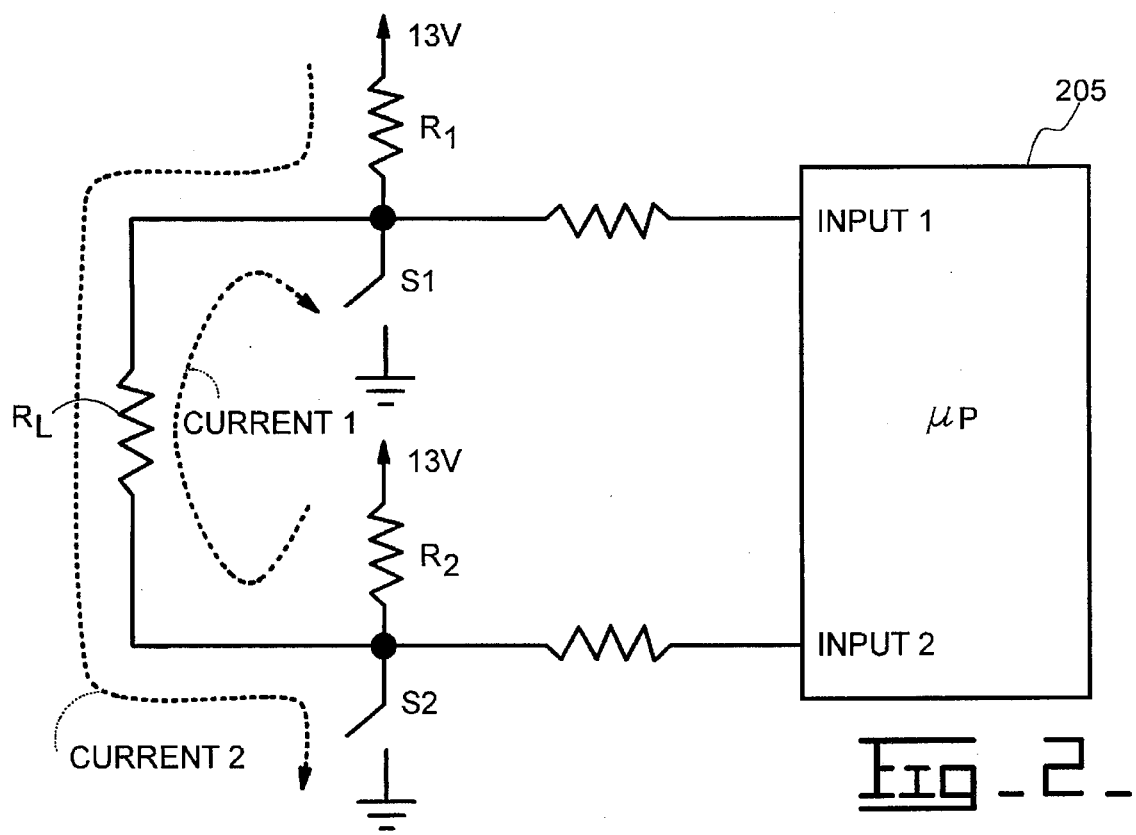
Fig_2_

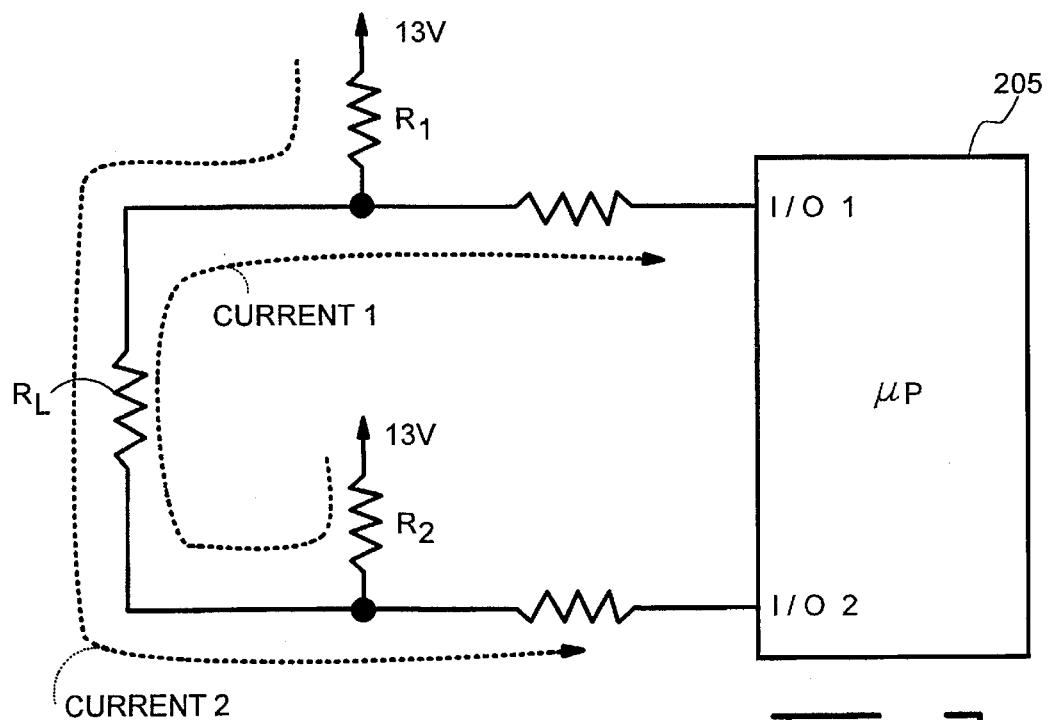
Fig-3-
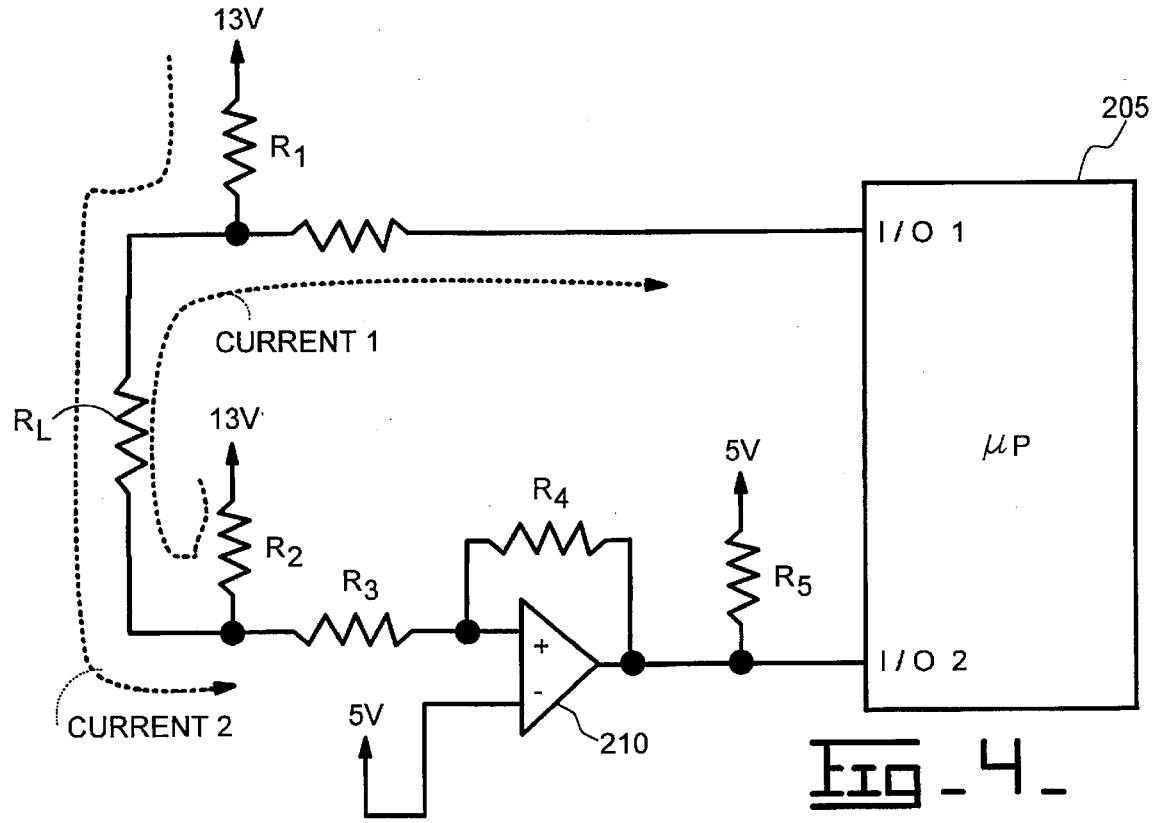
Fig-4-

FLUID LEVEL SENSING APPARATUS

TECHNICAL FIELD

This invention relates generally to a fluid level sensing apparatus and, more particularly, to a fluid level sensing apparatus that generates alternating current.

BACKGROUND ART

Modern electronically controlled engines receive information pertaining to many characteristics of the engine control system, including the amount of coolant in the cooling system. Thus, many of such engines include a coolant level sensor that indicates when the coolant level is too low.

Typical coolant level sensors include two electrodes that are inserted in the coolant system into an area where coolant is normally found, e.g., the radiator. The electrodes will pass current between one another via the coolant. As long as there is enough coolant to surround the electrodes, the electrodes will pass current between one another. However, once the coolant falls below a certain level, then an open circuit will develop between the electrodes. This open circuit condition is detected by the engine control, which may display a warning message to the operator.

One problem with utilizing direct current through a liquid environment is that the electrodes will be exposed to electrolytes that may corrode the electrodes. Thus, most engine manufactures will generate an alternating current between the electrodes to prevent corrosion. Reference is now made to FIG. 1, which shows a prior art example of a H-bridge circuit that creates an alternating current. As shown, the H-bridge circuit includes four switches labeled S1–S4. Each switch may include a semiconductor transistor. As S1 and S2 are closed, electrical current flows through $R_L$ (which represents the resistance associated with the coolant level sensor) in a direction, denoted as current 1. As S3 and S4 are closed, electrical current flows through $R_L$ is the opposite direction, denoted as current 2. Although H-bridge circuits provide the desired alternate current, such a circuit is quite expensive due to the requirement of four switches. What is desired is a circuit that creates an alternating current with fewer components.

The present invention is directed to overcoming one or more of the problems as set forth above.

DISCLOSURE OF THE INVENTION

In one aspect of the present invention, an apparatus for sensing the level of fluid, including a two electrode device being disposed in the fluid and a microprocessor. The microprocessor being connected to the two electrode device and delivering alternating current thereto. The microprocessor reads the voltage across the device, compares the voltage to a predetermined voltage level, and produces a warning signal in response to the fluid level being below a predetermined fluid level.

BRIEF DESCRIPTION OF THE DRAWINGS

For a better understanding of the present invention, reference may be made to the accompanying drawings in which:

FIG. 1 shows a prior art fluid sensing apparatus;

FIG. 2 shows a first embodiment of a fluid sensing apparatus associated with the present invention;

FIG. 3 shows a second embodiment of a fluid sensing apparatus associated with the present invention; and FIG. 4 shows a third embodiment of a fluid sensing apparatus associated with the present invention.

BEST MODE FOR CARRYING OUT THE INVENTION

Referring now to FIG. 2, a first embodiment of the present invention is shown. A microprocessor 205 having two analog input channels, input 1 and input 2, is connected to a coolant level sensor, represented by $R_L$. As shown, the microprocessor 205 is connected to the coolant level sensor $R_L$ via input resistors to protect the microprocessor input channels. The coolant level sensor $R_L$ is a two electrode device, which is well known in the art. The first embodiment includes two transistor switches, S1 and S2, which are both connected between a 13 volt energy source and ground. The first transistor switch S1 is connected to the first microprocessor input, input 1, while the second transistor switch S2 is connected to the second microprocessor input, input 2. The microprocessor 205 alternately biases the first and second transistor switches ON and OFF to create the alternating current through the coolant level sensor $R_L$.

For example, as the microprocessor 205 biases the first transistor switch ON, current travels in the direction illustrated by current 1, from the 13 volt energy source through resistor $R_2$ and the coolant level sensor $R_L$ to ground. Accordingly, the microprocessor 205 reads the voltage at input 2. If the voltage is found to be equal to the value of:

$$13 \text{ volts}*(R_L/(R_2+R_L))$$

then the level of coolant in the engine cooling system is said to be satisfactory.

Alternately, as the microprocessor 205 biases the second transistor switch ON, current travels in the direction illustrated by current 2, from the 13 volt energy source through resistor $R_1$ and the coolant level sensor $R_L$ to ground. Accordingly, the microprocessor 205 reads the voltage at input 1. If the voltage is found to be equal to the value of:

$$13 \text{ volts} * (R_L/(R_1+R_L))$$

then the level of coolant in the engine cooling system is said to be satisfactory.

Referring now to FIG. 3, a second embodiment of the present invention is shown. The microprocessor 205 is connected to the coolant level sensor $R_L$ via input/output channels, I/O 1 and I/O 2. The advantage of this particular embodiment is that no transistor switches need be used. To create the alternating current, the microprocessor 205 alternately transforms the I/O channels to an input and an output.

For example, to create a current through the coolant level sensor $R_L$ in one direction, the microprocessor 205 configures I/O 1 as an input channel by grounding it (while configuring I/O 2 as an output channel by driving it "high"). Consequently, current flows from the 13 volt energy source through $R_2$ and $R_L$ to I/O 1, as indicated by current 1. Accordingly, the voltage is read at I/O 2, which is configured as an input channel. If the voltage is found to be equal to the value of:

$$13 \text{ volts}*(R_L/(R_2+R_L))$$

then the level of coolant in the engine cooling system is said to be satisfactory.

To create a current through the coolant level sensor $R_L$ in the other direction, the microprocessor 205 configures I/O 2 as an input channel (while configuring I/O 1 as an output channel). Consequently, current flows from the 13 energy source through $R_1$ and $R_L$ to I/O 2, as indicated by current 1. Accordingly, the voltage is read at I/O 1, which is configured as an input channel. If the voltage is found to be equal to the value of:

$$13 \text{ volts}*(R_L/(R_1+R_L))$$

then the level of coolant in the engine cooling system is said to be satisfactory.

Finally, a third embodiment of the present invention is illustrated in FIG. 4. As shown, a comparator 210 having a non-inverting input is connected to the coolant level sensor $R_L$ via an input resistor $R_3$, an inverting input is connected to a reference voltage of 5 volts, and an output is connected to the second microprocessor input/output channel. A feedback resistor $R_4$ provides a feed forward path from the comparator output to the non-inverting input. Finally, the open-collector of the comparator 210 is connected to a 5 volt supply via resistor $R_5$.

To create current in one direction through the coolant level sensor $R_L$, as indicated by current 1, the microprocessor 205 configures I/O 1 as a grounded output channel and configures I/O 2 as an input channel. Alternately, to create current in the other direction, as indicated by current 2, the microprocessor 205 configures I/O 2 as an output channel and I/O 1 as an input channel. It is when I/O 2 is configured as an input channel, then the microprocessor 205 determines whether the engine coolant is below a predetermined level.

For example, when the engine coolant is above a satisfactory or predetermined level, the resistance of coolant level sensor $R_L$ is less than a predetermined resistance value, e.g., 5k ohms. Consequently, the equivalent impedance at the non-inverting input of the comparator 210 creates a voltage level that is less than the reference voltage at the inverting input, e.g., 5 volts, which causes the output of the comparator 210 to produce a "low" output. However, once the engine coolant falls below the satisfactory level, then the resistance of coolant level sensor $R_L$ increases to a value greater than the predetermined resistance value. Consequently, the equivalent impedance at the non-inverting input creates a voltage level that is greater than the reference voltage at the inverting input, which causes then the comparator to produce a "high" output. Accordingly, the microprocessor reads the comparator output voltage via the second microprocessor input channel and produces a warning signal when the engine coolant level falls below a predetermined level in response to the comparator output being "high".

We claim:

1. An apparatus for sensing the level of fluid, comprising:
   a two prong electrode device being disposed in the fluid;
   a microprocessor being connected to the two electrode device and delivering alternating current thereto, wherein the microprocessor reads the voltage across the device, compares the voltage to a predetermined voltage level, and produces a warning signal in response to the fluid level being below a predetermined fluid level; and
   first and second switches being connected between a 13 volt energy source and around, the first switch being connected between one end of the two prong electrode device and a first microprocessor input channel, and the second switch being connected between the other end of the two prong electrode device and a second microprocessor input channel, the microprocessor alternately biasing the first and second switches ON and OFF to create the alternating current through the coolant level sensor.

2. A fluid sensing apparatus, as set forth in claim 1 wherein the microprocessor reads the voltages at the microprocessor input channels and producing a warning signal in response to input voltage being substantially less than a predetermined voltage.

3. A fluid sensing apparatus, as set forth in claim 1, including first and second resistors being connected to a 13 volt energy source, the first resistor being connected between one end of the two prong electrode device and a first microprocessor input/output channel, and the second resistor being connected between the other end of the two prong electrode device and a second microprocessor input/output channel, wherein the microprocessor alternately configures the first and second input/output channels to an input and an output to produce the alternating current through the two prong electrode device.

4. A fluid sensing apparatus, as set forth in claim 3, wherein the microprocessor reads the voltage at the microprocessor input channel and produces a warning signal in response to input voltage being substantially less than a predetermined voltage.

5. A fluid sensing apparatus, as set forth in claim 1, including first and second resistors being connected to a 13 volt energy source, the first resistor being connected between one end of the two prong electrode device and a first microprocessor input/output channel, and the second resistor being connected between the other end of the two prong electrode device and a second microprocessor input/output channel, wherein the microprocessor alternately configures the first and second input/output channels to an input and an output to produce the alternating current through the two prong electrode device.

6. A fluid sensing apparatus, as set forth in claim 5, including a comparator having a non-inverting input connected to the second resistor and two prong device, an inverting input connected to a reference voltage and an output connected to the second microprocessor input/output channel, wherein the comparator produces a high output in response to the voltage at the non-inverting input being greater than the voltage at the inverting input.

7. A fluid sensing apparatus, as set forth in claim 6, wherein the microprocessor produces a warning signal in response to the comparator producing a high output.

8. An apparatus for sensing the level of fluid, comprising:
   a two prong electrode device being disposed in the fluid;
   a microprocessor being connected to the two electrode device and delivering alternating current thereto, wherein the microprocessor reads the voltage across the device, compares the voltage to a predetermined voltage level, and produces a warning signal in response to the fluid level being below a predetermined fluid level; and
   first and second resistors being connected to a 13 volt energy source, the first resistor being connected between one end of the two prong electrode device and a first microprocessor input/output channel, and the second resistor being connected between the other end of the two prong electrode device and a second microprocessor input/output channel, wherein the microprocessor alternately configures the first and second input/output channels to an input and an output to produce the alternating current through the two prong electrode device.

9. A fluid sensing apparatus, as set forth in claim 8, including a comparator having a non-inverting input connected to the second resistor and two prong device, an inverting input connected to a reference voltage and an output connected to the second microprocessor input/output channel, wherein the comparator produces a high output in response to the voltage at the non-inverting input being greater than the voltage at the inverting input.

10. A fluid sensing apparatus, as set forth in claim 9, wherein the microprocessor produces a warning signal in response to the comparator producing a high output.

* * * * *

UNITED STATES PATENT AND TRADEMARK OFFICE
CERTIFICATE OF CORRECTION

PATENT NO. : 5,668,536
DATED : September 16, 1997
INVENTOR(S) : Paul C. Gottshall, et al.

It is certified that error appears in the above-identified patent and that said Letters Patent is hereby corrected as shown below:

Column 3, line 64, delete "around" and insert -- ground --

Signed and Sealed this

Seventeenth Day of February, 1998

Attest:

BRUCE LEHMAN

Attesting Officer      Commissioner of Patents and Trademarks